US011805568B2

(12) United States Patent
Hsieh et al.

(10) Patent No.: US 11,805,568 B2
(45) Date of Patent: Oct. 31, 2023

(54) USER EQUIPMENT CONTEXT TRANSFER OVER RADIO ACCESS NETWORK PAGING

(71) Applicant: Google LLC, Mountain View, CA (US)

(72) Inventors: Ching-Jung Hsieh, Taipei (TW); Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/836,964

(22) Filed: Jun. 9, 2022

(65) Prior Publication Data

US 2022/0304097 A1    Sep. 22, 2022

Related U.S. Application Data

(63) Continuation of application No. 17/282,500, filed as application No. PCT/US2019/054794 on Oct. 4, 2019.

(Continued)

(51) Int. Cl.
*H04W 36/00* (2009.01)
*H04W 76/25* (2018.01)

(Continued)

(52) U.S. Cl.
CPC ........... *H04W 76/25* (2018.02); *H04W 12/06* (2013.01); *H04W 68/005* (2013.01)

(58) Field of Classification Search
None
See application file for complete search history.

(56) References Cited

U.S. PATENT DOCUMENTS 9,319,935 B2    4/2016  Fischer
2009/0061878 A1  3/2009  Fischer
(Continued)

FOREIGN PATENT DOCUMENTS

WO    2017078143    5/2017
WO    2017122588    7/2017
(Continued)

OTHER PUBLICATIONS

"ETSI TS 133 401 V13.4.0", Digital cellular telecommunications system (Phase 2+) (GSM); Universal Mobile Telecommunications System (UMTS); LTE; 3GPP System Architecture Evolution (SAE); Security architecture (3GPP TS 33.401 version 13.4.0 Release 13), Oct. 2016, 153 pages.

(Continued)

*Primary Examiner* — Gary Lafontant
(74) *Attorney, Agent, or Firm* — Colby Nipper PLLC

(57) ABSTRACT

This document describes methods and systems for user equipment (UE) context transfer over radio access network (RAN) paging. A first base station receives from a second base station a first message that includes a context that is associated with a user equipment while the user equipment was in an engaged mode with the second base station. The first base station transmits a second message that is a paging message to the user equipment and in response receives, from the user equipment, a third message that includes a resume message authentication code identifier. After the first base station verifies the third message using the resume message authentication code identifier, the first base station transmits, to the user equipment, a fourth message that enables the user equipment to resume the engaged mode with the first base station in accordance with the context.

20 Claims, 7 Drawing Sheets

Related U.S. Application Data

(60) Provisional application No. 62/742,101, filed on Oct. 5, 2018.

(51) Int. Cl.
*H04W 12/06* (2021.01)
*H04W 68/00* (2009.01)

(56) References Cited

U.S. PATENT DOCUMENTS

| | | | |
|---|---|---|---|
| 2013/0272132 A1* | 10/2013 | Heo | H04W 76/10 370/236.2 |
| 2013/0303088 A1* | 11/2013 | Watfa | H04W 60/00 455/41.2 |
| 2018/0160436 A1 | 6/2018 | Park et al. | |
| 2018/0234890 A1 | 8/2018 | Shih et al. | |
| 2018/0270716 A1 | 9/2018 | Takahashi et al. | |
| 2018/0270791 A1* | 9/2018 | Park | H04W 8/24 |
| 2018/0324138 A1* | 11/2018 | Das | H04W 36/0055 |
| 2020/0120552 A1* | 4/2020 | Yang | H04W 36/0069 |
| 2021/0360727 A1 | 11/2021 | Hsieh et al. | |

FOREIGN PATENT DOCUMENTS

| | | | | |
|---|---|---|---|---|
| WO | WO-2017121496 A1 * | 7/2017 | | H04L 9/0891 |
| WO | 2020072959 | 4/2020 | | |

OTHER PUBLICATIONS

"Foreign Office Action", IN Application No. 202147017183, dated Feb. 14, 2022, 6 pages.

"International Preliminary Report on Patentability", Application No. PCT/US2019/054794, dated Aug. 25, 2020, 15 pages.

"International Search Report and Written Opinion", Application No. PCT/US2019/054794, dated Dec. 12, 2019, 15 pages.

"RAN Paging Enhancement", 3GPP TSG-RAN WG3 Meeting #97bis, Prague, Czech Republic, Oct. 2017, 6 pages.

"RRC Resume Request Authentication Token Calculation", 3GPP TSG SA WG3 (Security) Meeting #92 ad-hoc Harbin (China), Sep. 2018, 4 pages.

* cited by examiner

USER EQUIPMENT CONTEXT TRANSFER OVER RADIO ACCESS NETWORK PAGING

RELATED APPLICATIONS

This application is a continuation of and claims priority to U.S. Non-Provisional patent application Ser. No. 17/282,500, filed on Apr. 2, 2021, which in turn is a National Stage Entry of International Patent Application Serial No. PCT/US2019/054794, filed Oct. 4, 2019, which in turn claims the benefit of U.S. Provisional Patent Application Ser. No. 62/742,101, filed on Oct. 5, 2018, the disclosures of which are incorporated by reference herein in their entireties.

BACKGROUND

A user equipment (UE) may, in certain instances, enter a radio resource control (RRC) connected state with a base station to receive downlink transmissions from a wireless network supported by the base station. While in the RRC connected state, the UE may communicate with the wireless network via the base station under conditions that relate to bit rates, mobility restrictions, security capabilities, signaling references, protocol data unit session resources, and the like. Today it is common for an Access and Mobility Function (AMF) of the wireless network to manage these conditions, otherwise referred to as user equipment contexts, as part of administering communications across a wireless network.

In certain instances, such as when there is an absence of downlink transmissions from the network to the UE via the base station, the base station may cause the UE to enter an RRC inactive state by sending the UE an RRC release message with a suspend configuration. In the event the network needs to resume downlink transmissions to the UE, it is possible that the UE has moved and that the UE needs to enter the RRC connected state with another base station before the downlink transmissions resume. In such a situation, resumption of the downlink transmissions is delayed while the other base station retrieves the user equipment contexts from the base station that previously caused the UE to enter the RRC inactive state.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method performed by a first base station of two base stations is described. The method comprises the first base station receiving from a second base station a first message that includes a context of a user equipment that was previously in an engaged mode with the second base station. In response, the first base station transmits to the user equipment a second message that includes a radio network temporary identifier that identifies the context. The first base station then receives, from the user equipment, a third message that includes a resume message authentication code identifier (MAC-I). After the first base station verifies the third message using the resume MAC-I, the base station transmits, to the user equipment, a fourth message that enables the user equipment to resume the engaged mode with the first base station in accordance with the context.

In some other aspects, a method performed by a user equipment is described. The method comprises the user equipment discontinuing an engaged mode with a second base station to enter a disengaged mode. The user equipment then receives from a first base station a first message that includes a radio network temporary identifier that identifies a context of the user equipment while the user equipment was in the engaged mode with the second base station. In response, the user equipment transmits a second message to the first base station that includes a resume message authentication code identifier (MAC-I) and causes the first base station to verify, using the resume MAC-I, the second message. In response to the first base station verifying the second message, the user equipment receives, from the first base station, a third message that causes the user equipment to resume the engaged mode with the first base station in accordance with the context.

The invention also provides other methods, such as a corresponding method performed by the second base station, and a corresponding method performed by the first and second base stations and the user equipment in combination. The invention also provides apparatus corresponding to the described methods such as each of a first base station, a second base station, and a user equipment, each arranged to put into effect the described corresponding method steps. The invention also provides computer program code arranged to put into effect the described methods when implemented on suitable data processing equipment, and computer-readable media carrying such computer program code.

The details of one or more implementations of common search space configuration and system information acquisition are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of a user equipment (UE) context transfer over radio access network (RAN) paging. The use of the same reference numbers in other instances in the description and the figures may indicate like elements.

DETAILED DESCRIPTION

This document describes methods and systems for user equipment (UE) context transfer over radio access network (RAN) paging. As part of the methods and systems, a first base station receives from a second base station a first message that is a paging message and includes a context associated with a UE while the UE was in an engaged mode with the second base station. The first base station transmits a second message to the UE that is a paging message and in response receives, from the user equipment, a third message that includes a resume message authentication code identifier (MAC-I). After the first base station verifies the third message using the resume MAC-I, the base station transmits, to the UE, a fourth message that enables the UE to resume the engaged mode with the first base station in accordance with the context.

A context manager application is described in this document. The context manager application may cause a base station to perform operations that are directed to management of contexts that may be associated with a user equipment, including verification of messages received from the user equipment.

Operating Environment

Figure 1:
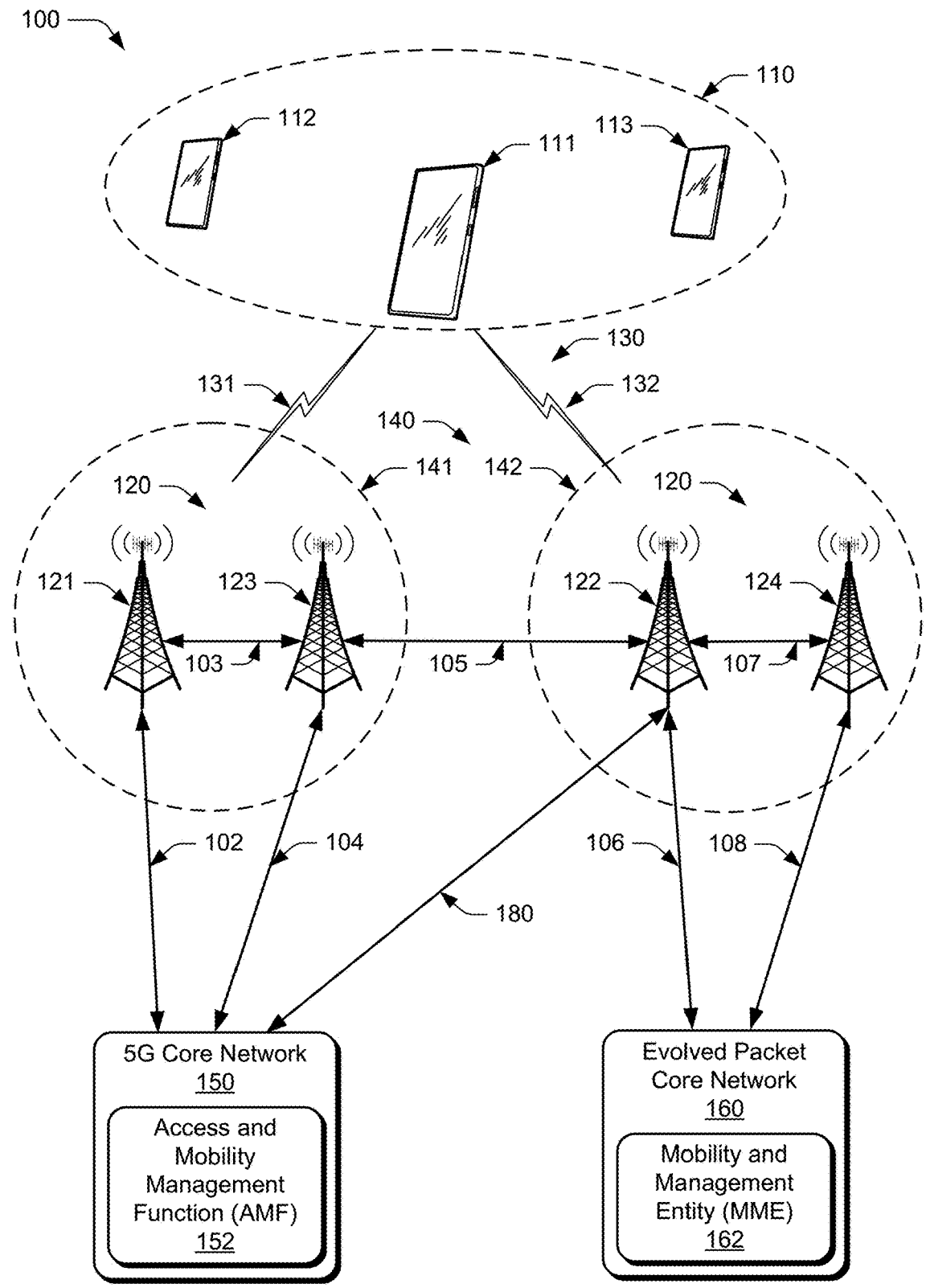
FIG. 1 illustrates an example operating environment in which various aspects of a UE context transfer over RAN paging can be implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate using an Xn Application Protocol (XnAP) through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Furthermore, and within the operating environment 100, contexts associated with the UE 110 (e.g., bit rates, mobility restrictions, security capabilities, signaling references, protocol data unit session resources), may be communicated via radio access network (RAN) paging messages as part of managing wireless communications within the operating environment 100. In general, a portion of a wireless communication protocol (e.g., a portion of wireless communication document 3GPP TS 38.331) may specify techniques associated with using RAN paging messages to transmit context information that may be associated with the UE 110 after it is no longer engaged with a base station.

For example, context information of the user equipment 110 operating in an engaged mode with the base station 123 may be saved by the base station 123 upon the UE 110 disconnecting from the base station 123. As part of managing wireless communications, the base station 123 may transmit, via a RAN paging message, the context information to the base station 121 via the Xn interface at 103, enabling the UE 110 to enter (or resume) the engaged mode with the base station 121.

Other examples may include the paging message (that includes the context information) being transmitted via the X2 interface 107 (in an instance where the UE 110 disconnects from a base station within the EPC 160 network and remains within the EPC 160 network) or the paging message being transmitted via the NG3 interface 180 (in an instance where the UE 110 disconnects from a base station within the EPC 160 network and moves to a base station within the 5G core network 150).

Example Devices

Figure 2:
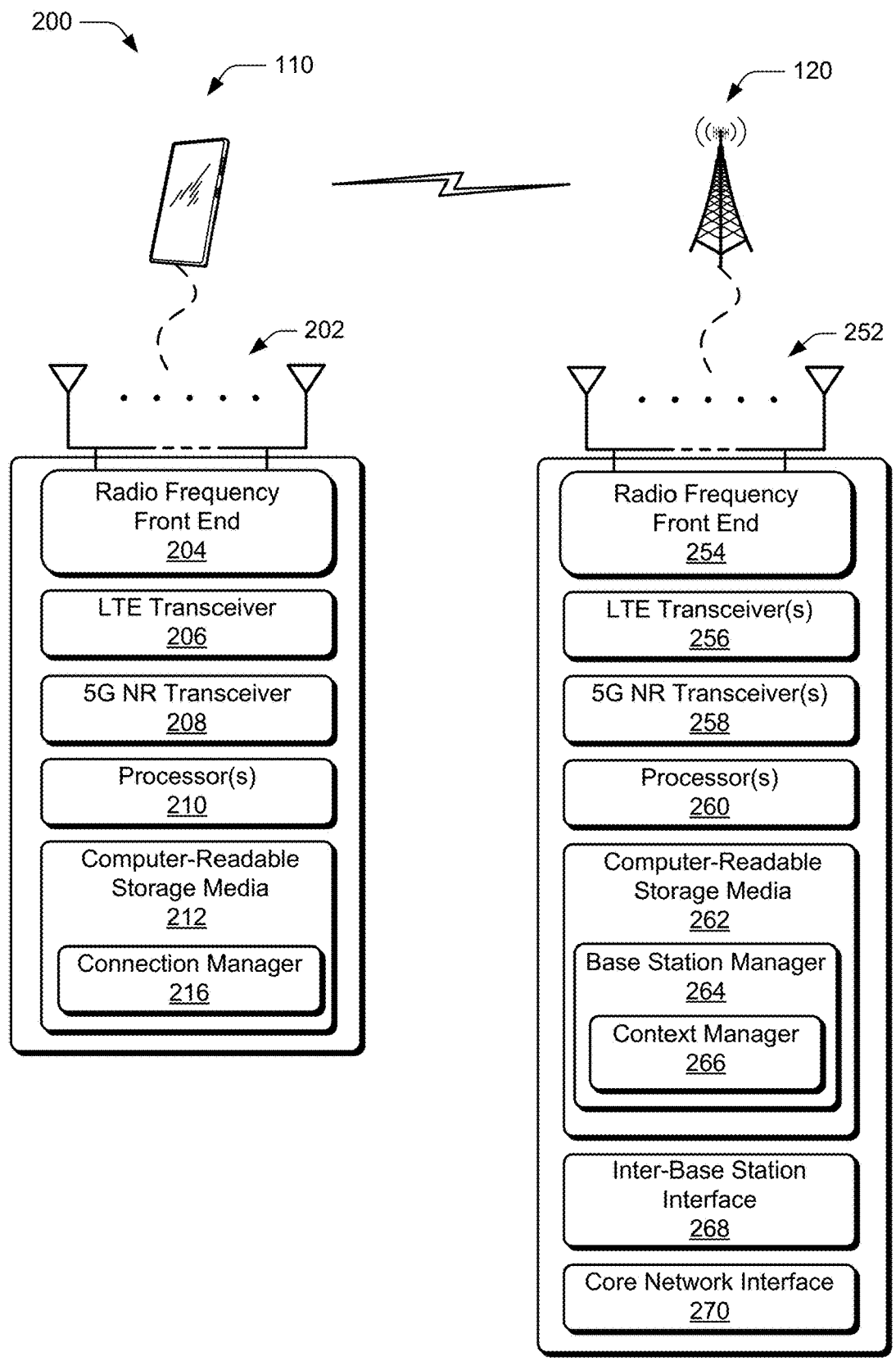
FIG. 2 illustrates an example device diagram for devices that can implement various aspects of a UE context transfer over RAN paging.

FIG. 2 illustrates an example device diagram 200 for devices that can implement various aspects of a UE context transfer over RAN paging. The example device diagram 200 includes the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple-core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory.

CRM 212 also includes code of a connection manager 216. Alternately or additionally, the connection manager 216 may be implemented in whole or in part as hardware logic or circuitry integrated with or separate from other components of the UE 110. In at least some aspects, the executing the code of the connection manager 216 configures the UE 110 to receive paging messages from the base station 120 and, in response, transmit messages to the base station 120 that indicate the UE 110 wishes to enter an engaged mode with the base station 120. In some instances, the messages may include a message authentication code identifier (MAC-I) that might be used by the base station 120 as part of a verification process.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory.

The CRM 262 also includes a base station manager 264. Alternately or additionally, the base station manager 264 may be implemented in whole or in part as hardware logic or circuitry integrated with or separate from other components of the base stations 120. In at least some aspects, the base station manager 264 configures the LTE transceivers 256 and the 5G NR transceivers 258 for communication with the UE 110, as well as communication with a core network.

The base station manager 264 includes code of a context manager 266. In at least some aspects, the executing the code of the context manager 266 configures the base station 120 to receive, from another base station, a paging message that includes user equipment context information. Executing the code of the context manager 266 may also cause the base station 120 to verify a message received from the UE 110 by comparing a resume MAC-I, included in the received message, to a calculated MAC-I. Executing the code of the context manager 266 may also cause the base station 120 to transmit a message that enables the UE 110 to enter an engaged mode with the base station 120 in accordance with the user equipment context information.

The base stations 120 include an inter-base station interface 268, such as an Xn and/or X2 interface, which the base station manager 264 configures to exchange user-plane and control-plane data between another base station 120, to manage the communication of the base stations 120 with the UE 110. The base stations 120 include a core network interface 270 that the base station manager 264 configures to exchange user-plane and control-plane data with core network functions and entities. In an instance where the other base station transmitting the paging message (that includes the context information) is a same generation as the base station 120, the inter-base station interface 268 may receive the paging message. In an instance where the other base station is a different generation than the base station 120, the core network interface 270 may receive the paging message.

Figure 3:
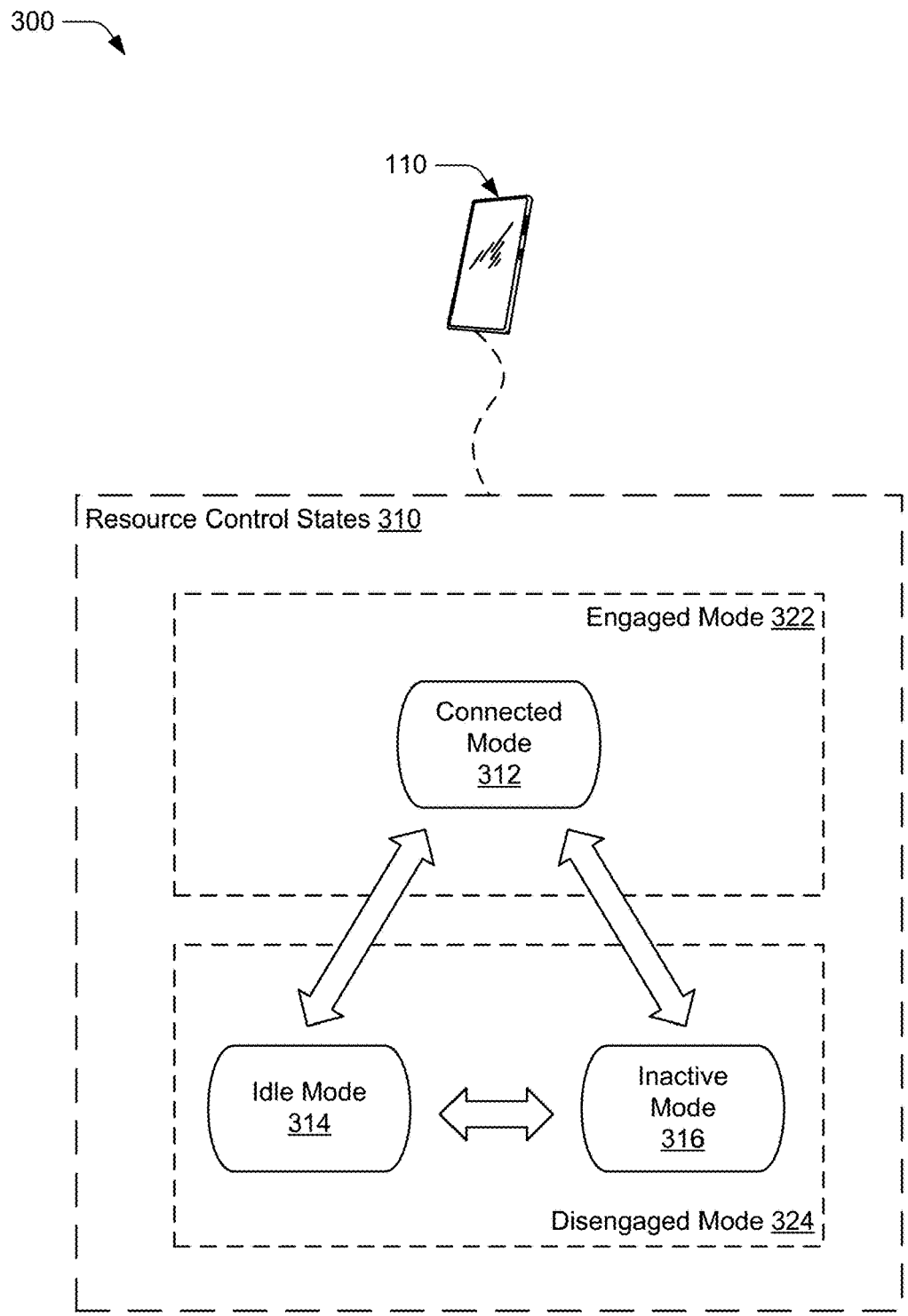
FIG. 3 illustrates example user equipment states between a user equipment and a base station.

FIG. 3 illustrates example user equipment states 300 between a user equipment (e.g., the UE 110) and a base station (e.g., the base station 120). Generally, a wireless network operator provides telecommunication services to user equipment through a wireless network. To communicate wirelessly with the network, a user equipment 110 utilizes a radio resource control (RRC) procedure to establish a connection to the network via a cell (e.g., the base station, a serving cell). Upon establishing the connection to the network via the base stations 120, the user equipment 110 enters a connected mode (e.g., RRC-connected mode, RRC_CONNECTED state, NR-RRC CONNECTED state, or E-UTRA RRC CONNECTED state).

The user equipment 110 operates according to different resource control states 310. Different situations may occur that cause the user equipment 110 to transition between different resource control states 310 as determined by the radio access technology. Example resource control states 310 illustrated in FIG. 3 include a connected mode 312, an idle mode 314, and an inactive mode 316. A user equipment 110 is either in the connected mode 312 or in the inactive mode 316 when an RRC connection is active. If an RRC connection is not active, then the user equipment 110 is in the idle mode 314.

In establishing the RRC connection, the user equipment 110 may transition from the idle mode 314 to the connected mode 312. After establishing the connection, the user equipment 110 may transition (e.g., upon connection inactivation) from the connected mode 312 to an inactive mode 316 (e.g., RRC-inactive mode, RRC INACTIVE state, NR-RRC INACTIVE state) and the user equipment 110 may transition (e.g., via an RRC connection resume procedure) from the inactive mode 316 to the connected mode 312. After establishing the connection, the user equipment 110 may transition between the connected mode 312 to an idle mode 314 (e.g., RRC-idle mode, RRC IDLE state, NR-RRC IDLE state, E-UTRA RRC IDLE state), for instance upon the network releasing the RRC connection. Further, the user equipment 110 may transition between the inactive mode 316 and the idle mode 314.

The user equipment 110 may be in an engaged mode 322 or may be in a disengaged mode 324. As used herein, an engaged mode 322 is a connected mode (e.g., connected mode 312) and a disengaged mode 324 is an idle, disconnected, connected-but-inactive, or connected-but-dormant mode (e.g., idle mode 314, inactive mode 316). In some cases, in the disengaged mode 324, the user equipment 110 may still be registered at a Non-Access Stratum (NAS) layer with an active radio bearer (e.g., in inactive mode 316).

Each of the different resource control states 310 may have different quantities or types of resources available, which may affect power consumption within the user equipment 110. In general, the connected mode 312 represents the user equipment 110 actively connected to (engaged with) the base stations 120. In the inactive mode 316, the user equipment 110 suspends connectivity with the base station 120 and retains information that enables connectivity with the base station 120 to be quickly re-established. In the idle mode 314 the user equipment 110 releases the connection with the base stations 120.

Some of the resource control states 310 may be limited to certain radio access technologies. For example, the inactive mode 316 may be supported in LTE Release 15 (eLTE) and 5G NR, but not in 3G or previous generations of 4G standards. Other resource control states may be common or compatible across multiple radio access technologies, such as the connected mode 312 or the idle mode 314.

Example Methods

Figure 4:
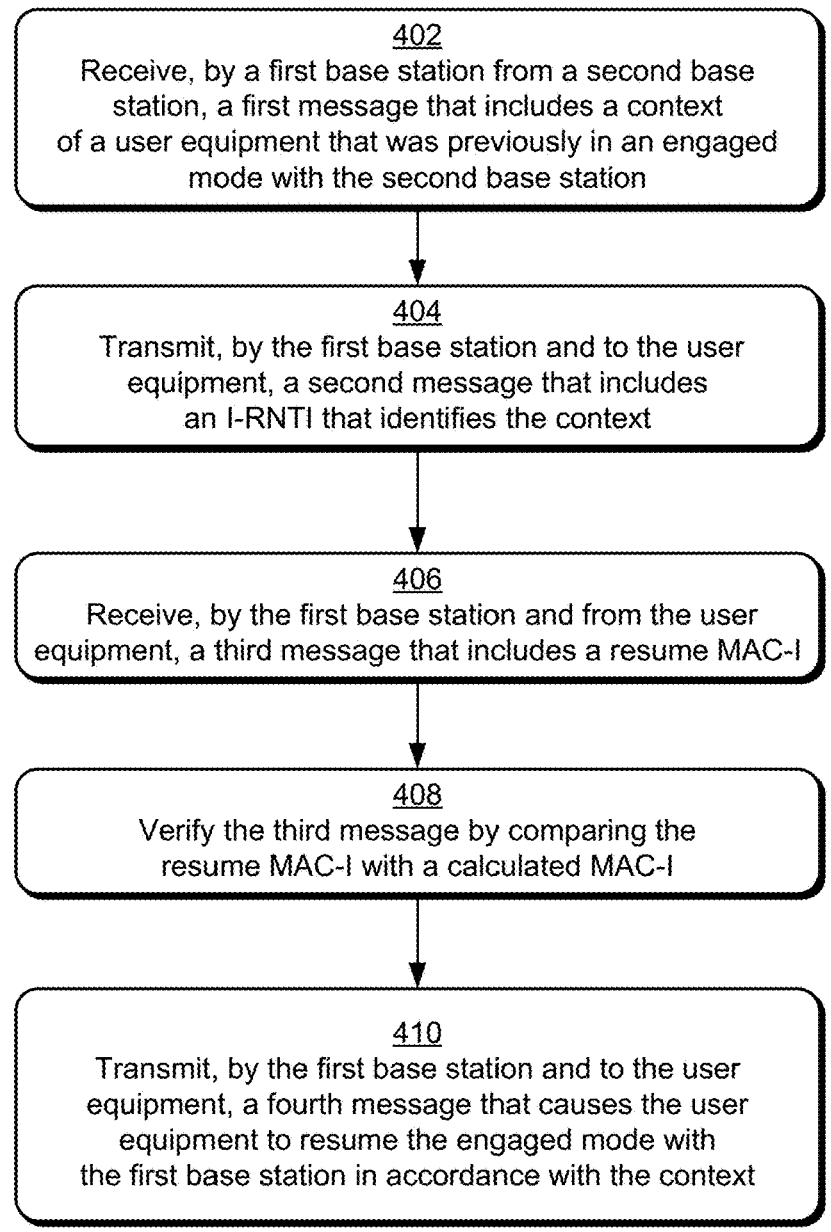
FIG. 4 illustrates an example method performed by a first of two base stations in accordance with aspects of techniques described herein.

FIG. 4 illustrates an example method 400 performed by a first of two base stations in accordance with aspects of techniques described herein. The method 400 may be performed by the base station 121 of FIG. 1, using elements of FIG. 1 and FIG. 2. Furthermore, and in the example method 400, the base station (e.g., the base station 121) may be a target base station.

At operation 402, a first base station (e.g., the base station 121) receives from a second base station (e.g., the base station 123, a last-serving base station) a first message that includes a context. The context may be associated with a user equipment (e.g., the UE 110) while the UE 110 was previously in an engaged mode with the second base station 123. In some instances, the engaged mode may be a radio resource control (RRC) connected state. The first message may be a radio access network (RAN) paging message in accordance with a 5G NR wireless-communication protocol, such as an Xn RAN paging message.

At operation 404, the first base station 121 transmits to the UE 110 a second message that includes a radio network temporary identifier (e.g., an I-RNTI) for identifying the context. The second message may be a radio resource control (RRC) paging message conforming with a 5G NR wireless-communication protocol.

At operation 406, and in response to transmitting the second message, the first base station 121 receives from the UE 110 a third message that includes a resume message authentication code identifier (MAC-I).

At operation 408 the first base station 121 verifies the third message using the resume MAC-I. Verifying the third message may, in some instances, include verifying that the resume MAC-I is identical with a calculated MAC-I, where the calculated MAC-I is generated by the first base station 121 based on a set of parameters that the first base station 121 receives from the second base station 123. The parameters may be received through the first message and comprise one or more parameters that are defined in a document that is used to support a wireless communication protocol. As an example, the document may correspond to 3GPP TS 33.501 and the parameters may correspond to a physical cell identifier (PCI), a cell radio network temporary identifier (C-RNTI), a resume constant, an NG-RAN key, ($K_gNB$) or a Next Hop key (NH).

In another example instance of the operation 408, verifying the third message may include the first base station 121 verifying that the resume MAC-I is identical to a calculated MAC-I generated by the second base station 123. The calculated MAC-I may be received, by the first base station 121 and from the second base station 123, through the first message.

In yet another example instance of the operation 408, verifying the third message may include the first base station 121 verifying that the resume MAC-I is identical to a calculated MAC-I from a plurality of calculated MAC-I's generated by the second base station 123. The calculated MAC-I's may be received, by the first base station 121 and from the second base station 123, via the first message.

At operation 410, the first base station 121 transmits, to the UE 110, a fourth message that enables the UE 110 to resume the engaged mode with the first base station 121 in accordance with the context (e.g., the context received by the first base station 121 from the second base station 123). The fourth message may be an RRCResume message. Resumption of the engaged mode with the first base station 121 may, for example, include the UE 110 entering a radio resource control (RRC) connected state (e.g., RRC_CONNECTED).

The example method 400 may include additional operations. For example, after the first base station 121 transmits to the UE 110 the fourth message that enables the UE 110 to resume the engaged mode, the first base station 121 may transmit to the second base station 123 a fifth message that includes a forwarding address indication to prevent a loss of user data that may be buffered or stored at the second base station 123. The first base station 121 may also transmit, to a core network (e.g., the AMF 152 of the 5GC 150) a sixth message that indicates a request to perform a path switch and receive, from the AMF 152 of the 5GC 150, a seventh message that includes a response to the path switch request (e.g., the sixth message). The first base station 121 may also transmit to the second base station 123 an eighth message that includes a UE context release command, effectuating a release of resources supporting wireless communications between the second base station 123 and the UE 110.

Figure 5:
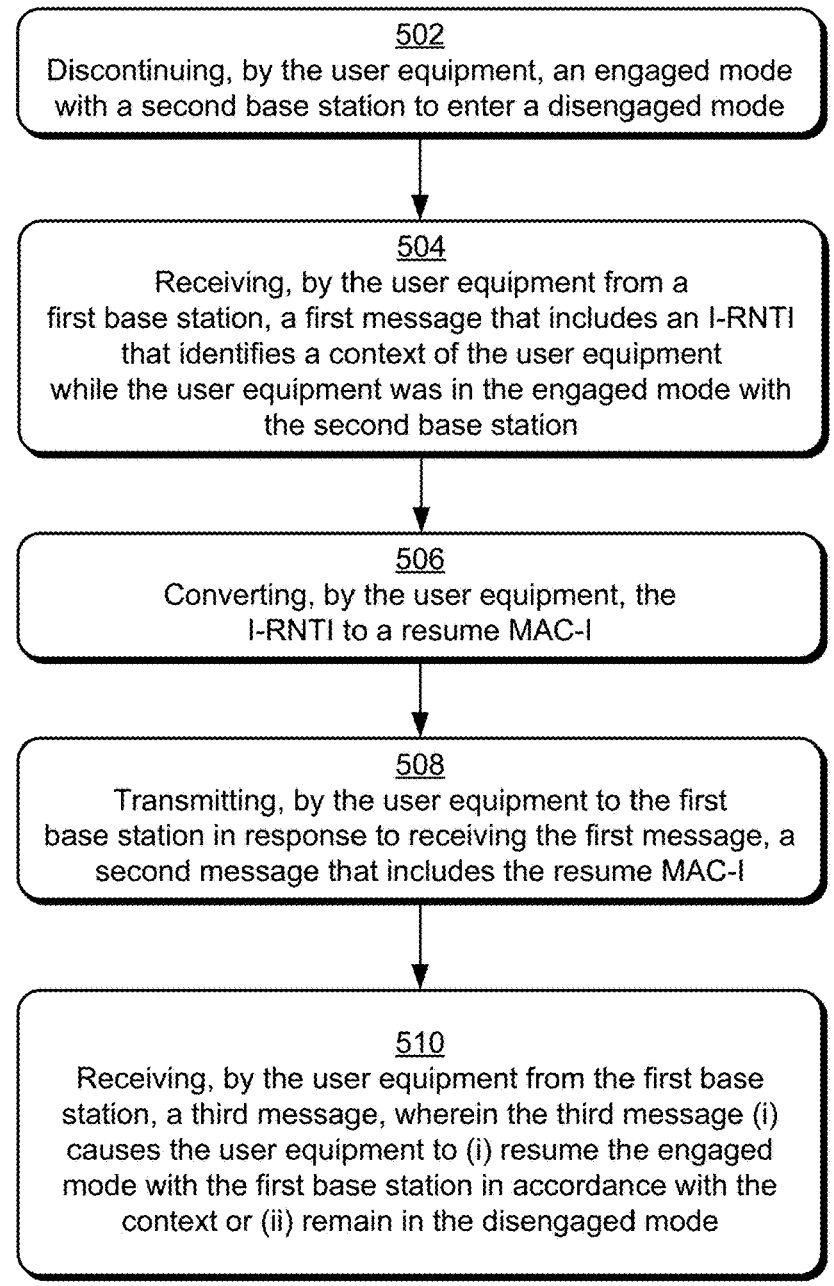
FIG. 5 illustrates an example method performed by a user equipment in accordance with aspects of techniques described herein.

FIG. 5 illustrates an example method 500 performed by a user equipment in accordance with aspects of techniques described herein. The user equipment may be the UE 110 of FIG. 1 and perform the method 500 using elements of FIG. 1 and FIG. 2.

At operation 502, the UE 110 discontinues an engaged mode with a second base station (e.g., the base station 123) to enter a disengaged mode. For example, discontinuing the engaged mode may cause the user equipment to enter a radio resource control (RRC) inactive state (e.g., RRC INACTIVE). Furthermore, entering the RRC INACTIVE state may be caused by the UE 110 receiving, from the second base station 123, a message that includes a suspend configuration.

At operation 504 the UE 110 receives, from a first base station (e.g., the base station 121), a first message that includes a radio network temporary identifier (I-RNTI) that identifies a context of the UE 110 while the UE 110 was in the engaged mode with the second base station 123. The first message may be a radio resource control (RRC) paging message in accordance with a 5G NR wireless-communication protocol. At operation 506, the UE 110 converts the I-RNTI to a resume message authentication code identifier (MAC-I).

At operation 508, and in response to receiving the first message, the UE 110 transmits to the first base station 121 a second message that includes a includes the resume MAC-I. The second message, which may be an RRCResumeRequest message, causes the first base station 121 to verify the second message based on the resume MAC-I.

At operation 510, the UE 110 receives, from the first base station 121, a third message. In an instance where the second message that includes the resume MCA-I is verified by the first base station 121 is verified, the third message causes the UE 110 to resume the engaged mode with the first base station 121 in accordance with the context identified at operation 504. For example, the third message may be an RRCResume message and the engaged mode may include the UE 110 entering a radio resource control (RRC) connected state (e.g., RRC_CONNECTED).

In an instance where the second message that includes the resume MAC-I is not verified by the first base station 121, the third message may cause the UE 110 to remain in the disengaged mode.

Figure 6:
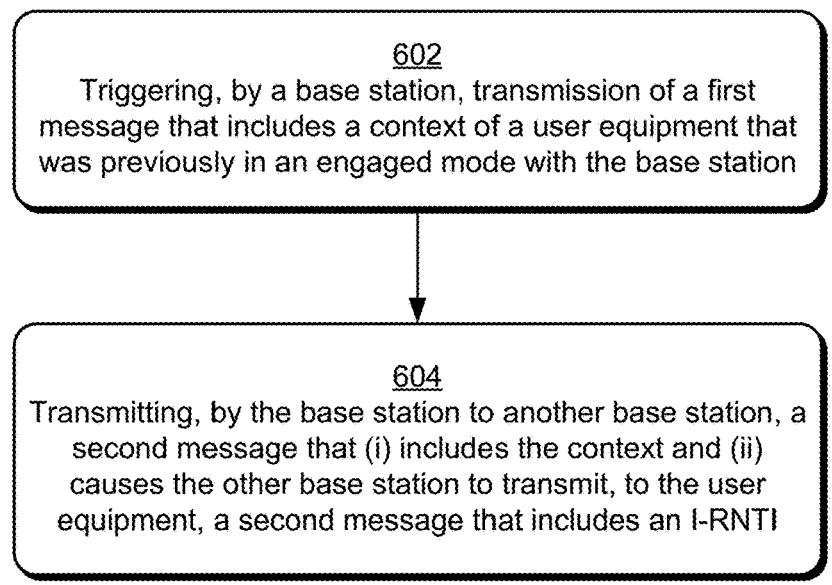
FIG. 6 illustrates an example method performed by a second of two base stations in accordance with aspects of techniques described herein.

FIG. 6 illustrates an example method 600 performed by a base station in accordance with aspects of techniques described herein. The method 600 may be performed by the base station 123 of FIG. 1, using elements of FIG. 1 and FIG. 2. Furthermore, and in the example method 600, the base station (e.g., the base station 123) may be a last-serving base station.

At operation 602, the base station 123 triggers transmission of a first message that includes a context of the UE 110 that was previously in an engaged mode with the base station 123. In some instances, incoming downlink user plane data or downlink signaling from a core network (e.g., the 5GC 150) may trigger the first message.

At operation 604, the base station 123 transmits the first message to another base station (e.g., the base station 121). The first message may include the context and cause the other base station 121 to transmit, to the UE 110, a second message that includes a radio network temporary identifier that identifies the context (e.g., an I-RNTI). In some instances at operation 604, the first message may be transmitted using radio access network (RAN) paging.

Signaling and Control Transactions

Figure 7:
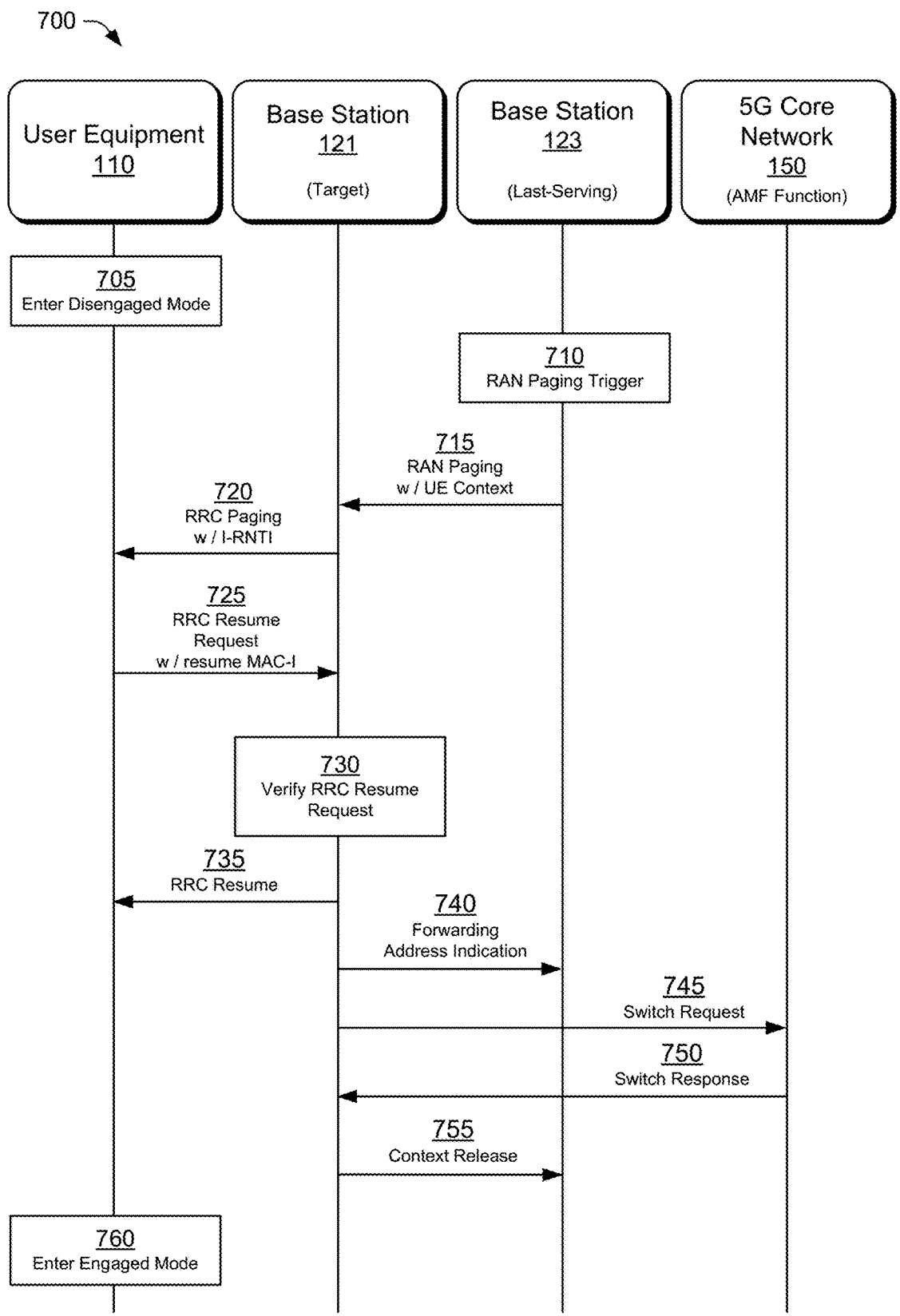
FIG. 7 illustrates example details of signal and control transactions associated with a UE context transfer over RAN paging in accordance with aspects of techniques described herein.

FIG. 7 illustrates details 700 of example signaling and control transactions associated with a UE context transfer over RAN paging in accordance with aspects of techniques described herein. The signaling and control transactions may occur in accordance with data frames or subframes of wireless communication protocols such as 5G NR wireless communication protocols. Furthermore, the example signaling and control diagrams may occur amongst the UE 110, the base station 121, the base station 123, and the 5G Core Network 150 of FIG. 1.

After the UE 110 enters a disengaged mode at 705 (e.g., RCC_INACTIVE), the base station 123 (e.g., a last-serving base station for the UE 110) triggers at 710 a RAN paging message to the base station 121 (a target base station). In some instances, incoming downlink user plane data or downlink signaling from a core network (e.g., the 5GC 150) may trigger the RAN paging message.

At 715, the base station 123 transmits a first message (e.g., the RAN paging message) to the base station 121. The RAN paging message includes context associated with the UE 110 while the UE 110 was in an engaged state with the base station 123. In some instances, the RAN paging message may include one or more calculated message authentication code identifiers (MAC-I's) generated by the base station 123.

At 720, the base station 121 transmits a second message (e.g., an RRC paging message) to the UE 110. The second message includes a radio network temporary identifier that identifies the context (e.g., an I-RNTI that identifies the context included in the message at 715).

At 725, the UE 110 transmits a third message (e.g., an RRC resume request message) to the base station 121. The RRC resume request message includes a resume message authentication code identifier (MAC-I). After the base station 121 verifies the RRC resume request message at 730, and at 735, the base station 121 transmits a fourth message (e.g., an RRC resume message) to the UE 110.

Additional signaling and transactions occur as part of the UE context transfer over RAN paging. At 740, the base station 121 transmits a forwarding address indication to the base station 123 and at 745, the base station 121 transmits a switch request message to the 5G core network 150 (e.g., the AMF 152). At 750, the 5G core network 150 transmits a switch response message to the base station 121 and, in response at 755, the base station 121 transmits a context release message to the base station 123. The UE 110 then enters an engaged mode with the base station 121 at 760. An example of the engaged mode includes a connected mode corresponding to an RRC_CONNECTED state.

The described signaling and control transactions are by way of example only, and are not constrained by the sequence or order of presentation or constrained to 3GPP or 5G wireless communications only. Furthermore, in certain aspects, additional signaling and control transactions may augment or replace the described signaling and control transactions.

The following paragraphs recite several examples:

Example 1: A method performed by a first of two base stations comprising: receiving, by the first base station and from a second base station, a first message that includes a context of a user equipment that was previously in an engaged mode with the second base station; transmitting, by the first base station in response to receiving the first message and to the user equipment, a second message that includes a radio network temporary identifier that identifies the context; receiving, by the first base station from the user equipment, a third message that includes a resume message authentication code identifier; verifying, by the first base station, the third message by comparing the resume message authentication code identifier received in the third message with a calculated message authentication code identifier; and transmitting, to the user equipment, a fourth message that enables the user equipment to resume the engaged mode with the first base station in accordance with the context.

Example 2: The method as recited in example 1 wherein: receiving the first message includes receiving a set of parameters that comprise one or more of a physical cell identifier, a cell radio network temporary identifier, a resume constant, or a key; and verifying the third message includes verifying that the resume message authentication code identifier is identical to a calculated message authentication code identifier generated by the first base station based on the set of parameters.

Example 3: The method as recited in example 1 or example 2, wherein: receiving the first message includes receiving a calculated message authentication code identifier generated by the second base station; and verifying the third message includes verifying that the resume message authentication code identifier is identical to the calculated message authentication code identifier.

Example 4: The method as recited in any of examples 1 to 3, wherein: receiving the first message includes receiving a plurality of calculated message authentication code identifiers, each calculated authentication code identifier of the plurality of calculated message authentication code identifiers generated by the second base station; and verifying the third message includes verifying that the resume authentication code identifier is identical to a calculated message authentication code identifier from the plurality of calculated message authentication code identifiers.

Example 5: The method as recited in any of examples 1 to 4, further comprising transmitting, by the first base station to the second base station, a fifth message that indicates forwarding address information.

Example 6: The method as recited in any of examples 1 to 5, further comprising: transmitting, by the first base station and to a core network, a sixth message that indicates a request to perform a path switch; and receiving, from the core network, a seventh message that includes a response to the sixth message.

Example 7: The method as recited in any of examples 1 to 6, further comprising transmitting, by the first base station and to the second base station, an eighth message that includes a context release command, the context release command effectuating a release of resources supporting wireless communications between the second base station and the user equipment.

Example 8: A method performed by a user equipment, the method comprising: discontinuing, by the user equipment, an engaged mode with a second base station to enter a disengaged mode; receiving, from a first base station, a first message that includes a radio network temporary identifier that identifies a context associated with the user equipment while the user equipment was in the engaged mode with the second base station; converting, by the user equipment, the radio network temporary identifier to a resume message authentication code identifier; transmitting, by the user equipment to the first base station in response to receiving the first message, a second message that includes the resume message authentication code identifier; and receiving, by the user equipment from the first base station, a third message from the first base station, wherein the third message causes the user equipment to: resume, with the first base station, the engaged mode in accordance with the context; or remain in the disengaged mode.

Example 9: The method as recited in example 8, wherein, prior to discontinuing the engaged mode, the user equipment receives, from the second base station, a radio resource control release message that includes a suspend configuration.

Example 10: The method as recited in example 8 or example 9, wherein discontinuing the engaged mode causes the user equipment to enter a radio resource control inactive state Example 11: The method as recited by any of examples 8 to 10, wherein the second base station is a last-serving base station.

Example 12: A method performed by a base station, the method comprising: triggering, by the base station, transmission of a first message that includes a context of a user equipment that was previously in an engaged mode with the base station; and transmitting, by the base station and to another base station, a second message that: includes the context; and causes the other base station to transmit, to the user equipment, a second message that includes a radio network temporary identifier that identifies the context.

Example 13: The method as recited by example 12, wherein triggering the transmission of the first message is based on incoming downlink user plane data or downlink signaling from a core network.

Example 14: The method as recited by example 12, wherein transmitting the first message includes transmitting the first message using radio access network paging.

Example 15: A first base station comprising: a wireless transceiver; and a processor and computer-readable storage media comprising instructions to implement a context manager application, the context manager application configured to direct the first base station to perform any method as recited in examples 1 to 7.

What is claimed is:
1. A method performed by a first of two base stations comprising:
  receiving, by the first base station and from a second base station, a Radio Access Network (RAN) paging message that includes a radio network temporary identifier (I-RNTI) that identifies a context of a user equipment that was previously in an engaged mode with the second base station;
  transmitting, by the first base station in response to receiving the RAN paging message and to the user equipment, a second message that includes the radio network temporary identifier that identifies the context;

receiving, by the first base station from the user equipment, a third message that includes a resume message authentication code identifier;

verifying, by the first base station, the third message by comparing the resume message authentication code identifier received in the third message with a calculated message authentication code identifier; and transmitting, to the user equipment, a fourth message that enables the user equipment to resume the engaged mode with the first base station in accordance with the context.

2. The method as recited in claim 1, wherein the receiving the RAN paging message includes:

receiving a set of parameters that comprise one or more of: a physical cell identifier, a cell radio network temporary identifier, a resume constant, or a key; and the verifying the third message includes:

verifying that the resume message authentication code identifier received in the third message is identical to a calculated message authentication code identifier generated by the first base station based on the set of parameters.

3. The method as recited in claim 1, wherein the receiving the RAN paging message includes:

receiving a calculated message authentication code identifier generated by the second base station; and the verifying the third message includes:

verifying that the resume message authentication code identifier received in the third message is identical to the calculated message authentication code identifier generated by the second base station.

4. The method as recited in claim 1, wherein the receiving the RAN paging message includes:

receiving a plurality of calculated message authentication code identifiers, each calculated authentication code identifier of the plurality of calculated message authentication code identifiers generated by the second base station; and verifying the third message includes verifying that the resume authentication code identifier is identical to a calculated message authentication code identifier from the plurality of calculated message authentication code identifiers.

5. The method as recited in claim 1, further comprising transmitting, by the first base station to the second base station, a fifth message that indicates forwarding address information.

6. The method as recited in claim 5, further comprising:

transmitting, by the first base station and to a core network, a sixth message that indicates a request to perform a path switch; and receiving, from the core network, a seventh message that includes a response to the sixth message.

7. The method as recited in claim 6, further comprising transmitting, by the first base station and to the second base station, an eighth message that includes a context release command, the context release command effectuating a release of resources supporting wireless communications between the second base station and the user equipment.

8. The method as recited in claim 1, wherein the second message is a Radio Resource Control (RRC) paging message.

9. The method as recited in claim 1, wherein the third message is a radio resource control resume request message.

10. A method performed by a user equipment, the method comprising:

discontinuing, by the user equipment, an engaged mode with a second base station to enter a disengaged mode;

receiving, from a first base station and based on the first base station receiving a Radio Access Network (RAN) paging message from the second base station, a first message that includes a radio network temporary identifier that identifies a context associated with the user equipment while the user equipment was in the engaged mode with the second base station;

converting, by the user equipment, the radio network temporary identifier to a resume message authentication code identifier;

transmitting, by the user equipment to the first base station in response to receiving the first message, a second message that includes the resume message authentication code identifier; and receiving, by the user equipment from the first base station, a third message from the first base station, wherein the third message causes the user equipment to:

resume, with the first base station, the engaged mode in accordance with the context; or remain in the disengaged mode.

11. The method as recited in claim 10, wherein, prior to the discontinuing the engaged mode, the user equipment receives, from the second base station, a radio resource control release message that includes a suspend configuration, and wherein the discontinuing the engaged mode causes the user equipment to enter a radio resource control inactive state.

12. A first base station comprising:

a wireless transceiver; and a processor and computer-readable storage media comprising instructions to implement a context manager application, the context manager application configured to direct the first base station to:

receive, from a second base station, a Radio Access Network (RAN) paging message that includes a radio network temporary identifier (I-RNTI) that identifies a context of a user equipment that was previously in an engaged mode with the second base station;

transmit, in response to receiving the RAN paging message and to the user equipment, a second message that includes the radio network temporary identifier that identifies the context;

receive, from the user equipment, a third message that includes a resume message authentication code identifier;

verify the third message by comparing the resume message authentication code identifier received in the third message with a calculated message authentication code identifier; and transmit, to the user equipment, a fourth message that enables the user equipment to resume the engaged mode with the first base station in accordance with the context.

13. The first base station of claim 12, wherein the context manager application is further configured to direct the first base station to transmit, to the second base station, a fifth message that indicates forwarding address information.

14. The first base station of claim 13, wherein the context manager application is further configured to direct the first base station to:

transmit, to a core network, a sixth message that indicates a request to perform a path switch; and receive, from the core network, a seventh message that includes a response to the sixth message.

15. The first base station of claim 14, wherein the context manager application is further configured to direct the first base station to transmit, to the second base station, an eighth message that includes a context release command, the context release command effectuating a release of resources supporting wireless communications between the second base station and the user equipment.

16. The first base station of claim 12, wherein the second message is a Radio Resource Control (RRC) paging message.

17. The first base station of claim 12, wherein the third message is a radio resource control resume request message.

18. The first base station of claim 12, wherein the RAN paging message includes a set of parameters that comprise one or more of: a physical cell identifier, a cell radio network temporary identifier, a resume constant, or a key; and the instructions to verify the third message include:

verifying that the resume message authentication code identifier is identical to a calculated message authentication code identifier generated by the first base station based on the set of parameters.

19. The first base station of claim 12, wherein the reception of the RAN paging message further configures the first base station to:

receive a calculated message authentication code identifier generated by the second base station; and the verification of the third message includes verifying that the resume message authentication code identifier received in the third message is identical to the calculated message authentication code identifier generated by the second base station.

20. The first base station of claim 12, wherein the reception of the RAN paging first message further configures the first base station to:

receive a plurality of calculated message authentication code identifiers, each calculated authentication code identifier of the plurality of calculated message authentication code identifiers generated by the second base station; and verify the third message includes verifying that the resume authentication code identifier is identical to a calculated message authentication code identifier from the plurality of calculated message authentication code identifiers.

* * * * *